United States Patent [19]
Park

[11] Patent Number: 5,818,551
[45] Date of Patent: Oct. 6, 1998

[54] THIN FILM TRANSISTOR-LIQUID CRYSTAL DISPLAY HAVING PATTERNED AMORPHOUS SILICON AND N+ AMORPHOUS LAYERS AND A MANUFACTURING METHOD THEREFOR

[75] Inventor: Woon-Yong Park, Suwon, Rep. of Korea

[73] Assignee: Samsung Electronics Co., Ltd., Kyungki-do, Rep. of Korea

[21] Appl. No.: 584,070

[22] Filed: Jan. 11, 1996

[30] Foreign Application Priority Data

Jan. 6, 1995 [KR] Rep. of Korea ............ 1995-189

[51] Int. Cl.[6] ............ G02F 1/1333; G02F 1/136
[52] U.S. Cl. ............ 349/43; 349/187; 438/30; 438/229
[58] Field of Search ............ 349/43, 46, 138, 349/438, 107

[56] References Cited

U.S. PATENT DOCUMENTS

| | | | |
|---|---|---|---|
| 5,289,016 | 2/1994 | Noguchi | 349/43 |
| 5,367,179 | 11/1994 | Mori | 349/43 |
| 5,483,082 | 1/1996 | Takizawa et al. | 349/43 |
| 5,610,737 | 3/1997 | Akiyama et al. | 349/43 |
| 5,621,556 | 4/1997 | Fulks et al. | 349/43 |

Primary Examiner—William L. Sikes
Assistant Examiner—Kenneth Parker
Attorney, Agent, or Firm—Cushman Darby & Cushman IP Group of Pillsbury Madison & Sutro LLP

[57] ABSTRACT

A thin film transistor-liquid crystal display (TFT-LCD) and a method of manufacturing the same prevent a short by forming a pixel electrode and a data line on different layers, and enhance the resultant image produced by the TFT-LCD by forming a passivation layer at a lower pixel electrode. To form this TFT-LCD, a gate electrode and an adjacent gate electrode are formed on a substrate. A gate insulating layer is then deposited on both the gate electrode and the adjacent gate electrode and an amorphous silicon layer, an $N^+$ amorphous silicon layer, and a source/drain metal are sequentially formed on the gate insulating layer, and partially etched. A passivation layer surrounds the source/drain metal and the amorphous silicon layer is etched using the passivation layer as a mask. A pixel electrode is then formed on the upper gate insulating layer in which the amorphous silicon layer is not deposited.

6 Claims, 10 Drawing Sheets

THIN FILM TRANSISTOR-LIQUID CRYSTAL DISPLAY HAVING PATTERNED AMORPHOUS SILICON AND N+ AMORPHOUS LAYERS AND A MANUFACTURING METHOD THEREFOR

BACKGROUND OF THE INVENTION

1. Field of the Invention

The present invention relates to a thin film transistor-liquid crystal display (hereinafter referred to as a TFT-LCD) and a manufacturing method thereof. More particularly, this invention relates to a TFT-LCD and a manufacturing method thereof for preventing a short by forming a pixel electrode and a data line on each different layer, achieving a simplification in the manufacturing process, and forming a passivation layer at a lower pixel electrode, thereby enhancing a resultant image produced by the TFT-LCD.

2. Description of the Related Art

A conventional TFT-LCD is shown in FIG. 1, and a manufacturing method for forming a conventional TFT-LCD is sequentially shown in FIGS. 2A–2D. FIGS. 3A–3D respectively show plan views of the steps illustrated by FIGS. 2A–2D.

As shown in FIG. 2A, a gate metal is deposited on a substrate and is etched to form a gate electrode 2 and a storage capacitor electrode 4. A gate insulating layer 6 is then deposited on the substrate and electrodes, and an amorphous silicon layer 8 and an N+ amorphous silicon layer 10 are sequentially deposited on the gate insulating layer 6.

Then, as shown in FIG. 2B, a source/drain metal 12 is deposited on the N+ amorphous silicon layer 10 and partially etched. Both the amorphous silicon layer 8 and the N+ amorphous silicon layer 10 are then partially etched.

As shown in FIG. 2C, a pixel electrode 14 is formed on both the source/drain metal 12 and the gate insulating layer 6, and is then partially etched.

As shown in FIG. 2D, after using a portion of the etched pixel electrode 14 as a mask, a source/drain electrode 16 is formed by etching both the amorphous silicon layer 8 and the N+ amorphous silicon layer 10.

However, as shown in FIGS. 3C and 3D, in the conventional TFT-LCD, since a source/drain metal 12 and a pixel electrode are formed in the same layer, the data line and the pixel electrode may be easily and electrically shorted therebetween, thereby reducing a production yield.

FIG. 4 is a transverse cross-sectional view of another conventional TFT-LCD and FIGS. 5A–5D are transverse cross-sectional views showing a sequence of manufacturing the conventional TFT-LCD shown in FIG. 4.

As shown in FIG. 5A, a gate metal is deposited on a substrate and is etched to form a gate electrode 20 and a storage capacitor electrode 22. A gate insulating layer 24 is then deposited on the substrate, gate electrode 20 and storage capacitor electrode 22, and an amorphous silicon layer 26 and an N+ amorphous silicon layer 28 are sequentially deposited on the gate insulating layer 24.

A source/drain electrode 32 and an upper electrode 34 of a storage capacitor are then formed by etching a source/drain metal 30, see FIG. 5B, and the N+ amorphous silicon layer 28 is then etched. Then, as shown in FIG. 5C, the amorphous silicon layer 26 formed on the gate insulating layer 24 is etched.

Finally, as shown in FIG. 5D, a pixel electrode 36 is formed on both the source/drain electrode 32 and the upper electrode 34 of the storage capacitor and partially etched, after which a passivation layer 38 is deposited on the pixel electrode 36, and is partially etched.

However, in the conventional TFT-LCD, since the passivation layer 38 lies on the pixel electrode 36, a residual image occurs because of a charge trap which is caused by the passivation layer 38 in driving, thereby inducing a poor image.

SUMMARY OF THE INVENTION

An object of the present invention relates to a TFT-LCD and a manufacturing method thereof for preventing a short by forming a pixel electrode and a data line on each different layer, achieving a simplification in the manufacturing process, and forming a passivation layer at a lower pixel electrode, thereby enhancing a resultant image produced by the TFT-LCD.

In order to achieve this object, a TFT-LCD according to the present invention includes a gate electrode and a previous gate electrode that are formed on a substrate. A gate insulating layer deposited on both the gate electrode and the adjacent gate electrode and an amorphous silicon layer is formed on the gate insulating layer. An N+ amorphous silicon layer is formed on the amorphous silicon layer and etched to be separated at the portion which faces the gate electrode. A source/drain electrode is then formed on the N+ amorphous silicon layer to have the same pattern as the N+ amorphous silicon layer and a pixel electrode is formed on the source/drain electrode.

In this manner, the present invention not only prevents an electrical short by forming a pixel electrode and a data line on different layers, and but also prevents a residual image by forming a passivation layer at a lower pixel electrode.

BRIEF DESCRIPTION OF THE DRAWINGS

The preferred embodiments of the present invention will now be described more specifically with reference to the attached drawings, wherein.

DESCRIPTION OF THE PREFERRED EMBODIMENT

A preferred embodiment of the present invention will become apparent from a study of the following detailed description, when viewed in light of the accompanying drawings.

Figure 1:
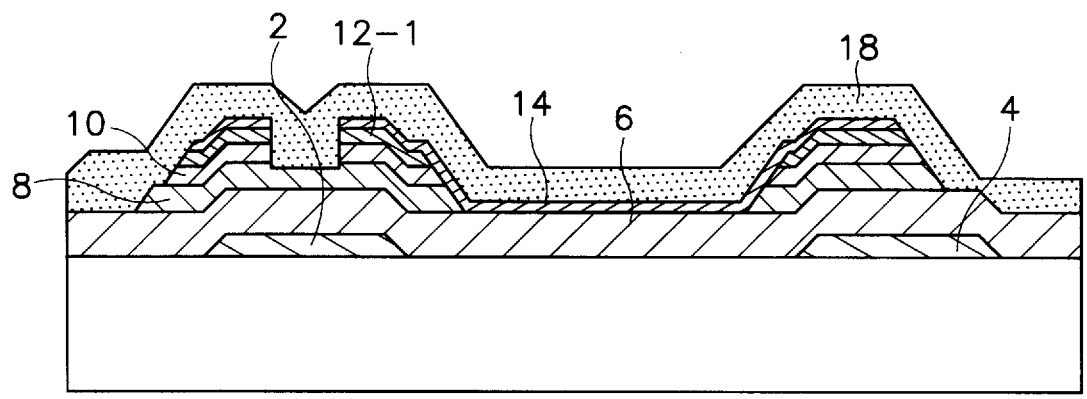
FIG. 1 shows a conventional TFT-LCD.
Figure 4:
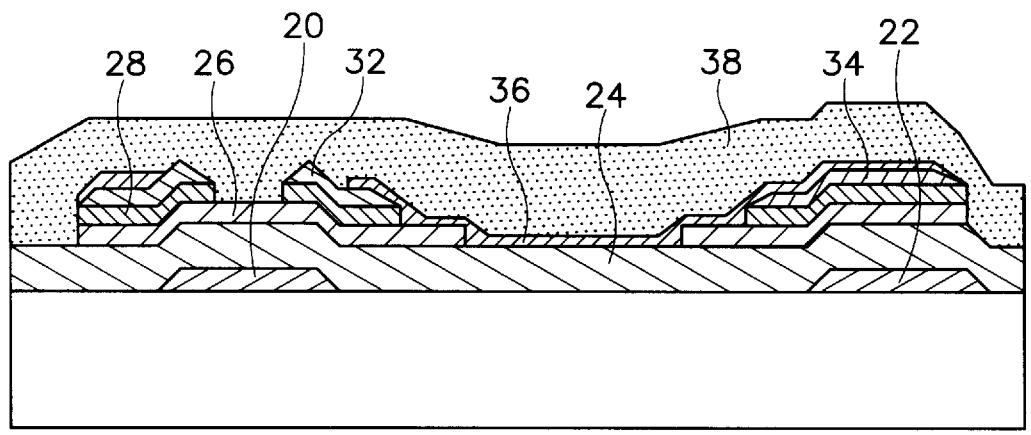
FIG. 4 is a transverse cross-sectional view of another conventional TFT-LCD.
Figure 2A:
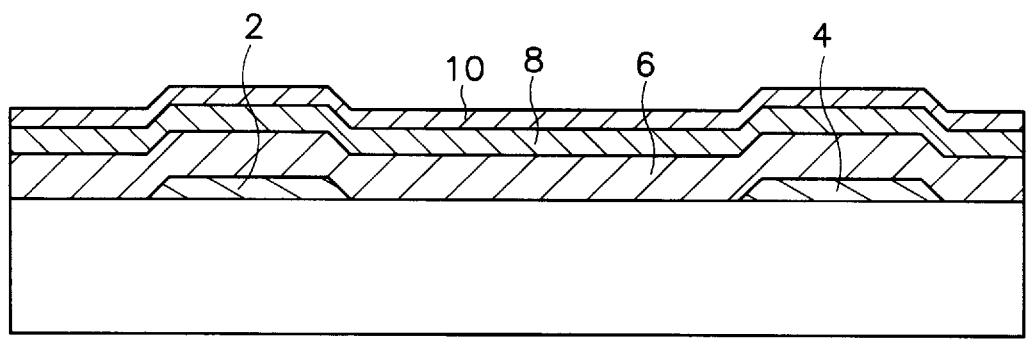
FIGS. 2A to 2D are transverse cross-sectional views showing sequential steps of a method of producing the TFT-LCD shown in FIG. 1.
Figure 2B:
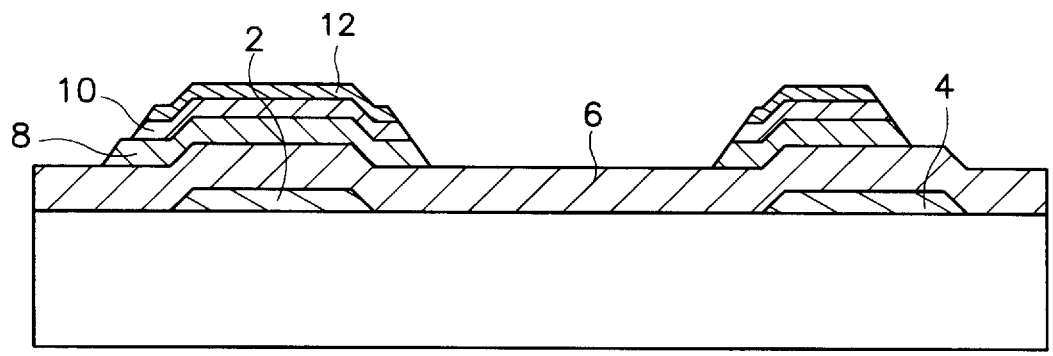
Figure 2C:
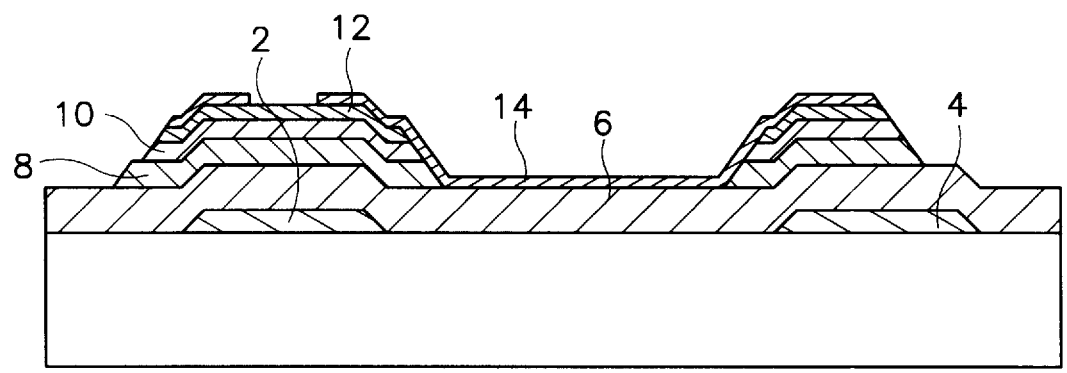
Figure 2D:
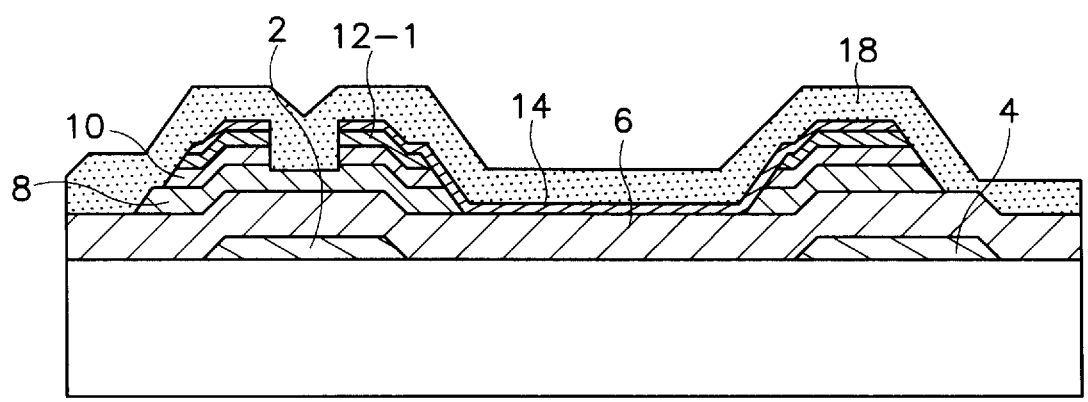
Figure 3A:
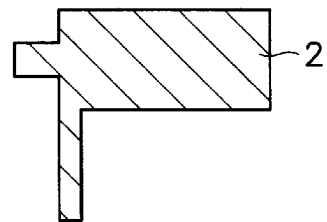
FIGS. 3A to 3D are plan views illustrating each of FIGS. 2A to 2D.
Figure 3B:
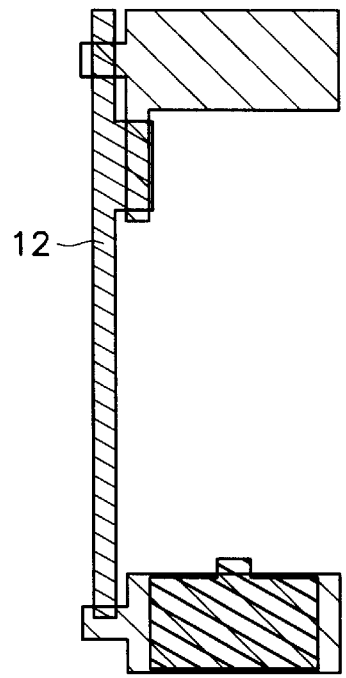
Figure 3C:
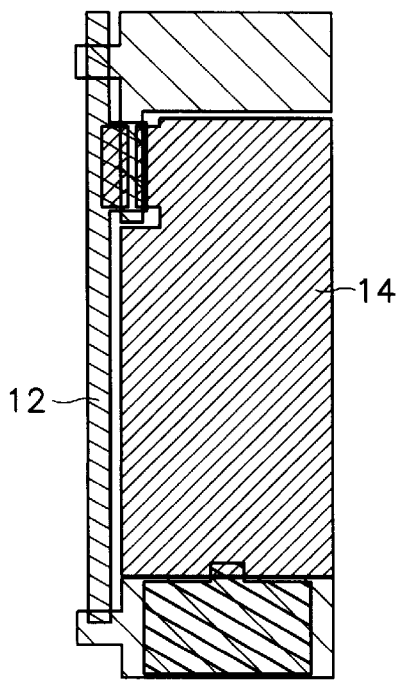
Figure 3D:
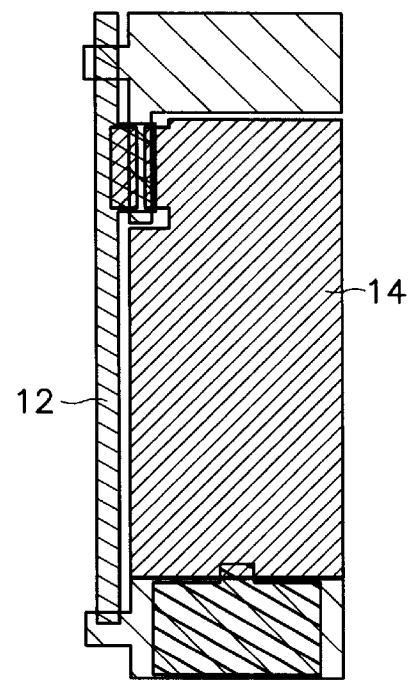
Figure 5A:
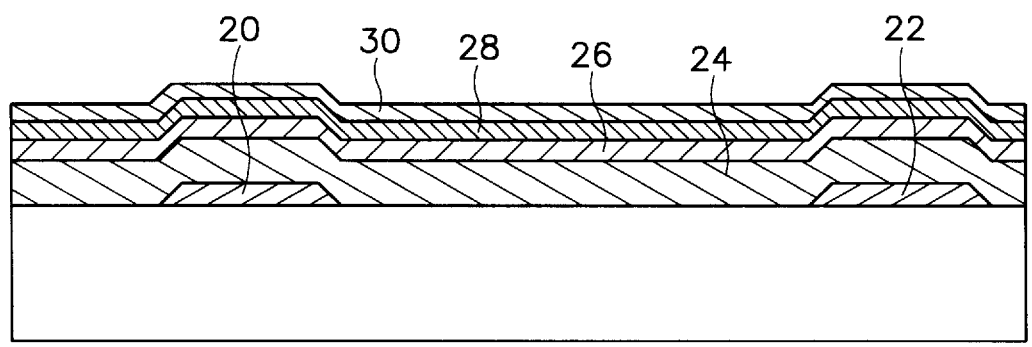
FIGS. 5A to 5D are transverse cross-sectional views showing sequential steps of a method of producing the TFT-LCD of FIG. 4.
Figure 5B:
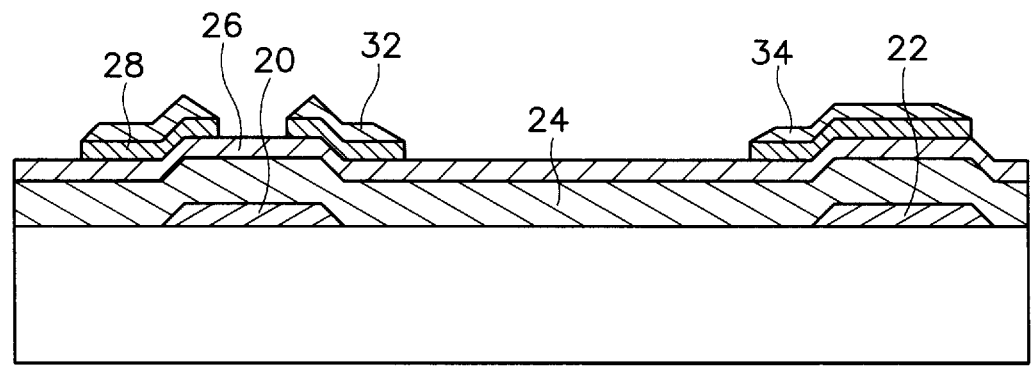
Figure 5C:
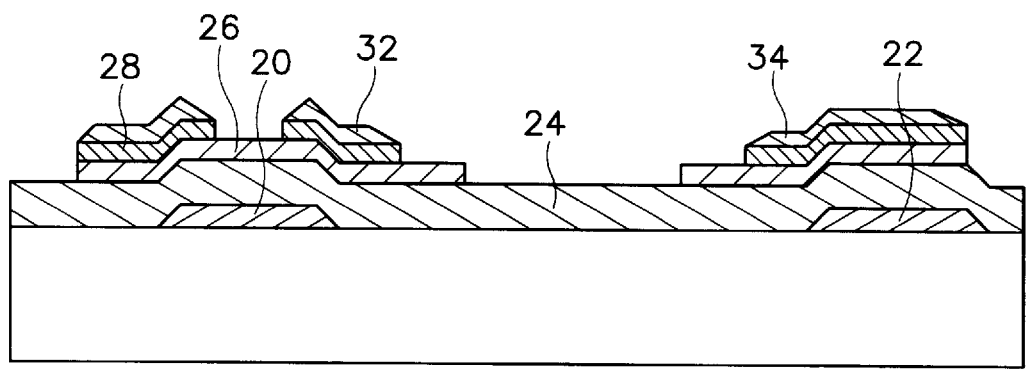
Figure 5D:
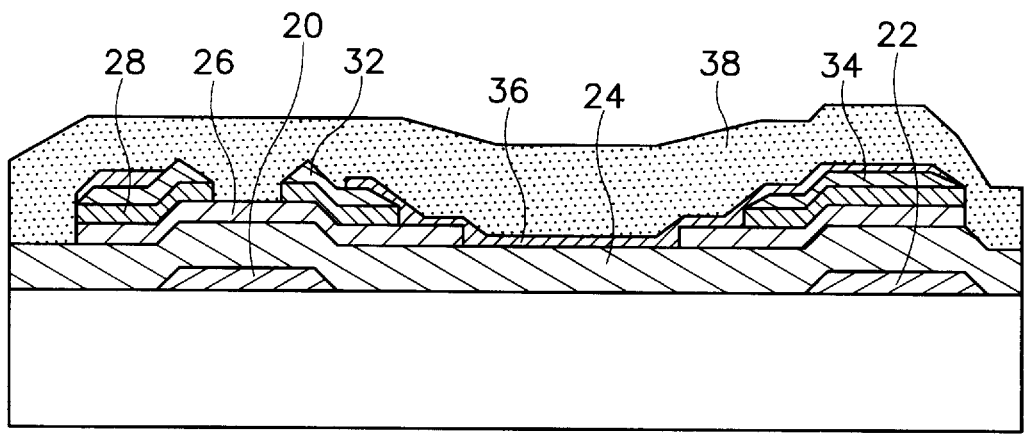
Figure 6:
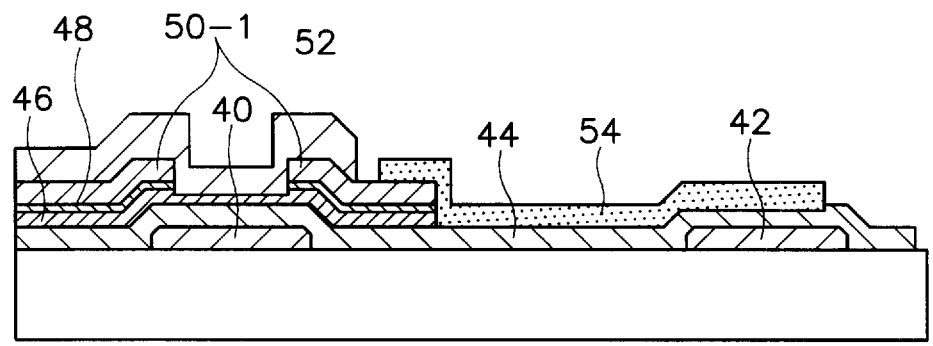
FIG. 6 shows a TFT-LCD according to a preferred embodiment of the present invention.

As shown in FIG. 6, a TFT-LCD according to a preferred embodiment of the present invention includes a gate electrode 40 and an adjacent gate electrode 42 that are formed on a substrate. A gate insulating layer 44 is deposited on the gate electrode 40, the adjacent gate electrode 42 and the substrate. An amorphous silicon layer 46 is formed on the gate insulating layer 44 and an N+ amorphous silicon layer 48 is formed on the amorphous silicon layer 46 and etched to expose a portion of the amorphous silicon layer 46 above the gate electrode 40. A source/drain electrode 50 is formed on the N+ amorphous silicon layer 48 to have the same pattern as the N+ amorphous silicon layer 48, and a pixel electrode 54 is formed on the source/drain electrode 50.

A manufacturing method for producing a TFT-LCD according to a preferred embodiment of the present invention is shown in FIGS. 7A–7E. A gate metal is first deposited on a substrate and a gate electrode 40 and an adjacent gate electrode 42 are formed by etching the gate metal. A gate insulating layer 44 is deposited on the substrate, the gate electrode 40 and the adjacent gate electrode 42, and an amorphous silicon layer 46 is deposited on the gate insulating layer 44. An N+ amorphous silicon layer 48 is deposited on the amorphous silicon layer 46, and a source/drain metal 50 is deposited on the N+ amorphous silicon layer 48. The N+ amorphous silicon layer 48 is etched after forming a source/drain electrode 50-1 and a data line by etching the source/drain metal 50. The amorphous silicon layer 46 is then partially etched and a passivation layer 52 is formed on the source/drain electrode 50-1. A pixel electrode 54 is then formed on the gate insulating layer 44 having the etched amorphous silicon layer 46. This method will now be described in greater detail with reference to FIGS. 7A–7E.

Figure 7A:
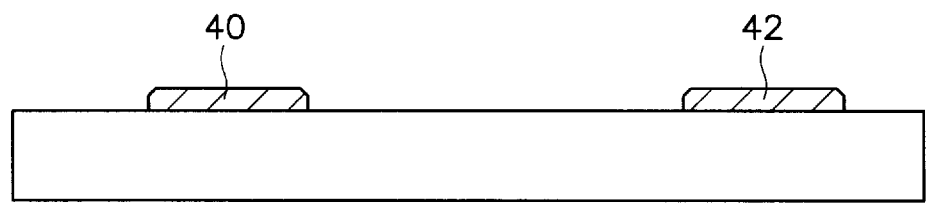
FIGS. 7A to 7E are transverse cross-sectional views showing sequential steps of a method of producing the TFT-LCD of FIG. 6.

As shown in FIG. 7A, a gate metal is deposited on the substrate and is etched to form a gate electrode 40 and an adjacent gate electrode 42.

Figure 7B:
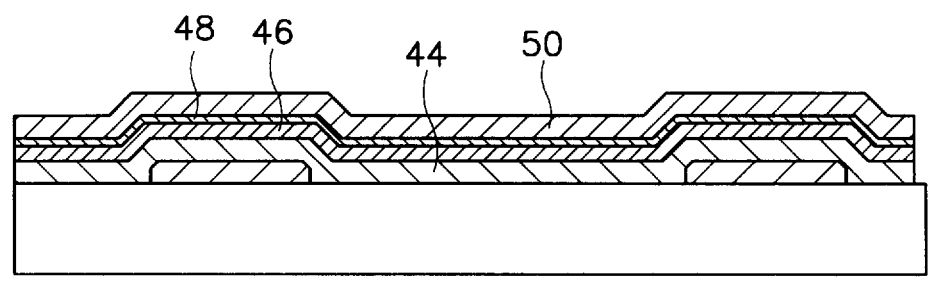

As shown in FIG. 7B, a gate insulating layer 44 is deposited on the substrate and both the gate electrode 40 and the adjacent gate electrode 42. An amorphous silicon layer 46 is then deposited on the gate insulating layer 44, an N+ amorphous silicon layer 48 is deposited on the amorphous silicon layer 46 and a source/drain metal 50 is deposited on the N+ amorphous silicon layer 48.

Figure 7C:
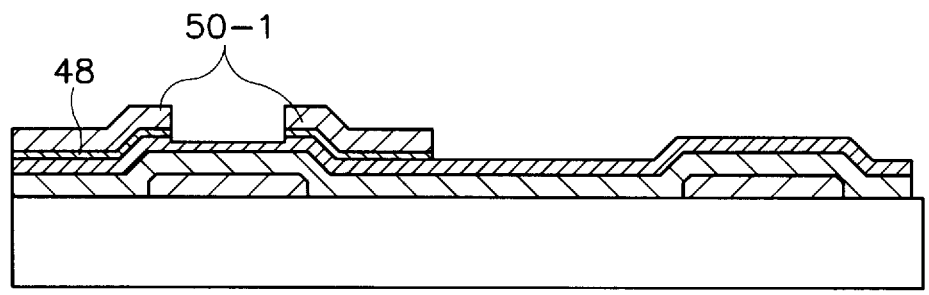

As shown in FIG. 7C, after both the source/drain electrode 50-1 and a data line are formed by etching the source/drain metal 50, the N+ amorphous silicon layer 48 is etched by using the source/drain electrode 50-1 as a mask.

Figure 7D:
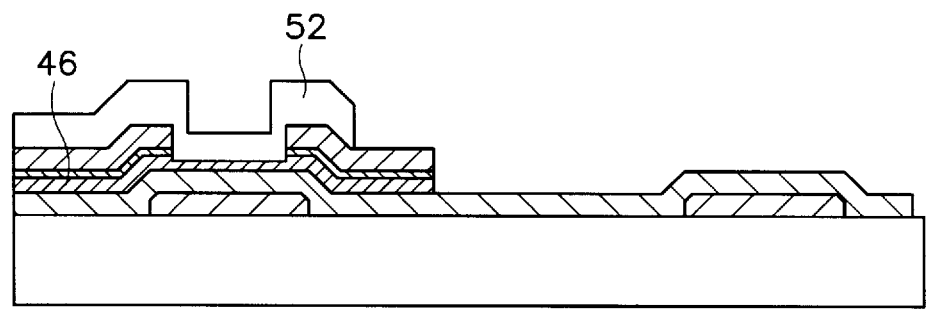
Figure 7E:
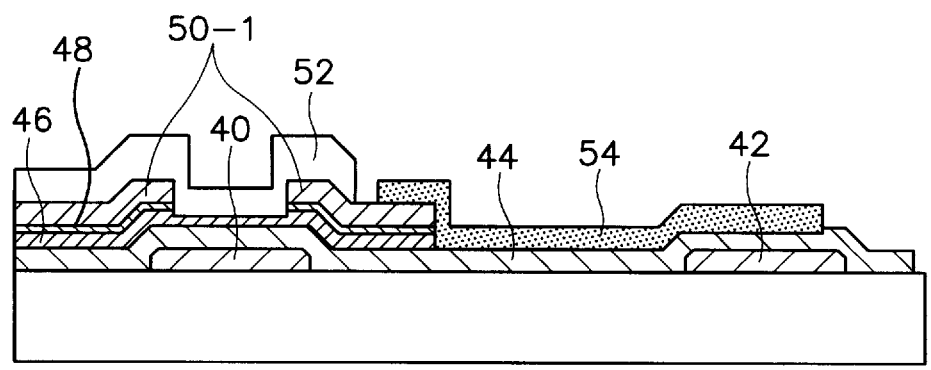
Figure 8A:
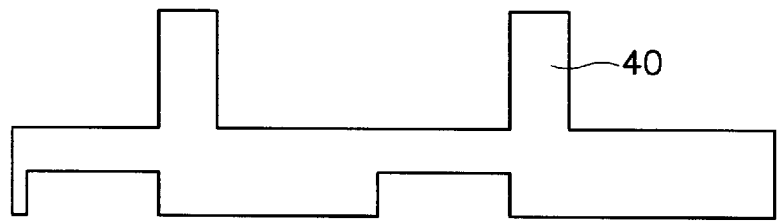
FIGS. 8A to 8E are plan views illustrating each of FIGS. 7A to 7E.
Figure 8B:
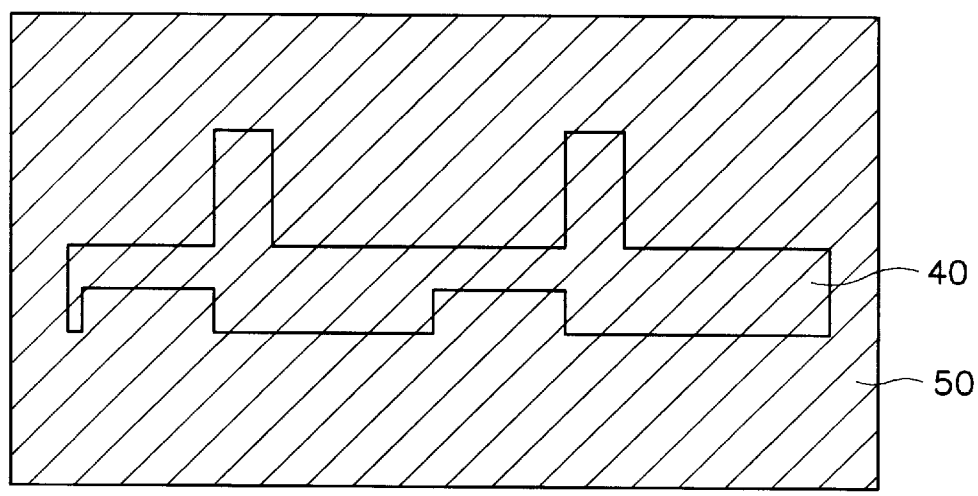
Figure 8C:
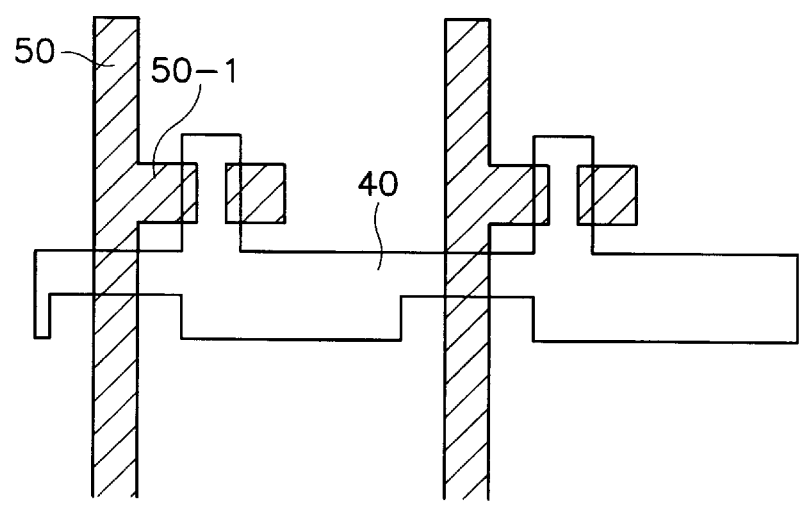
Figure 8D:
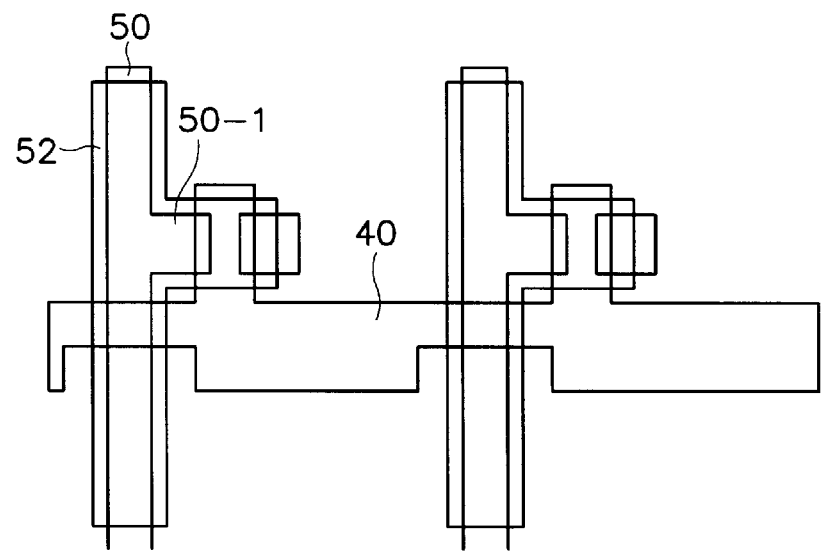
Figure 8E:
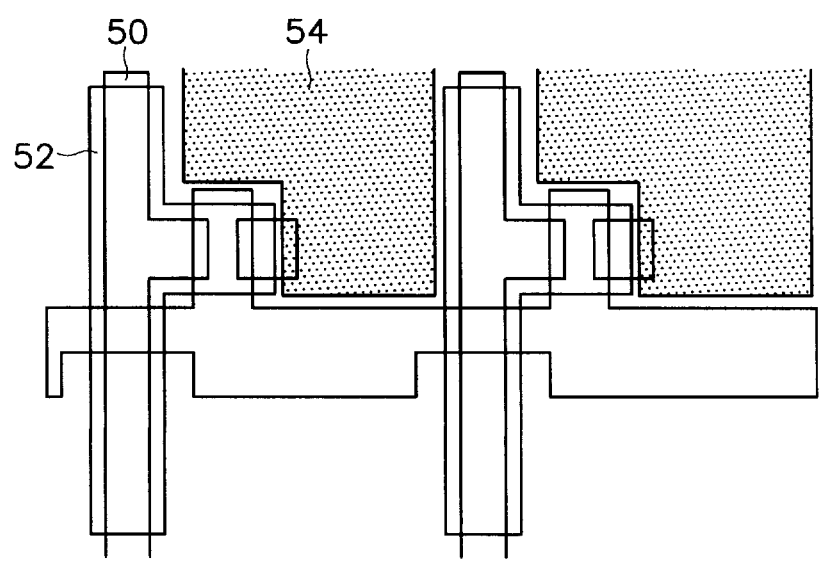

As shown in FIG. 7D, a passivation layer 52 having a width larger than 0.5 µm is formed on the source/drain electrode 50-1, and the amorphous silicon 46 is partially etched by using the passivation layer 52 as a mask.

A transparent conductive material is deposited on the gate insulating layer 44 in which the amorphous silicon layer 46 is etched, thereby forming a pixel electrode 54.

As described above, the present invention not only prevents an electrical short by forming a pixel electrode and a data line on different layers, and but also prevents a residual image by forming a passivation layer at lower pixel electrode.

It is understood that various other modifications will be apparent to and can be readily made by those skilled in the art without departing from the scope and spirit of this invention. Accordingly, it is not intend that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A method for manufacturing a thin film transistor-liquid crystal display, comprising the steps of:

depositing a gate metal on a substrate;

forming a gate electrode by etching said gate metal;

depositing a gate insulating layer on said gate electrode;

depositing an amorphous silicon layer on said gate insulating layer;

depositing an N+ amorphous silicon layer on said amorphous silicon layer;

depositing a source/drain metal on said N+ amorphous silicon layer;

etching partially said source/drain metal to form source/drain electrodes and a data line;

etching partially said N+ amorphous silicon layer;

forming a passivation layer on said source/drain electrodes and said data line;

etching partially said amorphous silicon layer; and forming a pixel electrode on a portion of said gate insulating layer exposed by the partial etching of said amorphous silicon layer.

2. The method for manufacturing a thin film transistor-liquid crystal display as defined in claim 1, wherein said source/drain electrodes and said data line are used as a mask in the steps of etching said N+ amorphous silicon layer.

3. The method for manufacturing a thin film transistor-liquid crystal display as defined in claim 1, wherein said passivation layer is used as a mask in the step of etching said amorphous silicon layer.

4. A thin film transistor-liquid crystal display, comprising:

a gate electrode formed on a substrate;

a gate insulating layer deposited on said gate electrode;

an amorphous silicon layer formed on said gate insulating layer;

an N+ amorphous silicon layer having a pattern so that it is separated at a portion which faces said gate electrode;

a source/drain metal layer formed on said N+ amorphous silicon layer and having the same pattern as said N+ amorphous silicon layer;

a passivation layer formed on said source/drain metal layer wherein a first portion of said source/drain metal layer is not covered by said passivation layer; and a pixel electrode formed on a portion of said gate insulating layer and connected to the first portion of said source/drain metal layer, wherein said amorphous silicon layer has the same pattern as said passivation layer except for a portion under the first portion of said source/drain metal layer.

5. The thin film transistor-liquid crystal display as defined in claim 4, wherein said pixel electrode is made of a transparent conductive material.

6. The thin film transistor-liquid crystal display as defined in claim 4, wherein a width of said passivation layer is wider than a width of said source/drain metal layer by more than 0.5 µm.

* * * * *